United States Patent
Liang et al.

(10) Patent No.: US 6,672,921 B1
(45) Date of Patent: *Jan. 6, 2004

(54) MANUFACTURING PROCESS FOR ELECTROPHORETIC DISPLAY

(75) Inventors: Rong-Chang Liang, Newton, MA (US); Mary Chan-Park, Chelmsford, MA (US); Zarng-Arh George Wu, Reading, MA (US); Xianhai Chen, Lowell, MA (US); HongMei Zang, Malden, MA (US)

(73) Assignee: SiPix Imaging, Inc., Milpitas, CA (US)

( * ) Notice: Subject to any disclaimer, the term of this patent is extended or adjusted under 35 U.S.C. 154(b) by 668 days.

This patent is subject to a terminal disclaimer.

(21) Appl. No.: 09/606,654

(22) Filed: Jun. 28, 2000

Related U.S. Application Data

(63) Continuation-in-part of application No. 09/518,488, filed on Mar. 3, 2000.

(51) Int. Cl.[7] .................. G02B 26/02; G09G 3/34
(52) U.S. Cl. .................. 445/24; 359/296; 264/496
(58) Field of Search .................. 445/24; 359/296; 264/496, 1.7

(56) References Cited

U.S. PATENT DOCUMENTS

| | | | |
|---|---|---|---|
| 3,612,758 A | | 10/1971 | Evans |
| 3,668,106 A | * | 6/1972 | Ota .................. 358/305 |
| 3,689,346 A | | 9/1972 | Rowland .................. 156/245 |
| 3,885,964 A | * | 5/1975 | Nacci .................. 430/326 |
| 3,928,671 A | | 12/1975 | Robusto et al. .................. 427/88 |
| 4,071,430 A | | 1/1978 | Liebert |
| 4,093,534 A | | 6/1978 | Carter et al. |
| 4,285,801 A | | 8/1981 | Chiang |
| 4,680,103 A | | 7/1987 | Beilin Solomon I. et al. |
| 4,741,604 A | * | 5/1988 | Kornfeld .................. 359/296 |

(List continued on next page.)

FOREIGN PATENT DOCUMENTS

| | | | |
|---|---|---|---|
| CA | 2340683 | 2/2001 | |
| DE | 199 27 359 | 12/2000 | |
| EP | 1089 118 A2 | 4/2001 | |
| JP | 57-104116 | 6/1982 | |
| JP | 5917930 | 9/1984 | |
| JP | 64-86116 | 3/1989 | ............. G02F/1/19 |
| JP | 2-223934 | 9/1990 | |
| JP | 2-284125 | 11/1990 | |
| WO | WO 98/57226 | 12/1998 | |
| WO | WO 99/08151 | 2/1999 | ......... G02F/1/1339 |
| WO | WO 99/56171 | 11/1999 | |
| WO | WO 00/03291 | 1/2000 | ........... G02F/1/167 |
| WO | WO 0036649 | 6/2000 | |
| WO | WO 00/60410 | 10/2000 | |
| WO | WO 00/77571 | 12/2000 | |

OTHER PUBLICATIONS

Hopper, M.A. et al., "An Electrophoretic Display, it's Properties, Model and Addressing", IEEE Transactions on Electron Devices, 26(8): 1148–1152.

(List continued on next page.)

*Primary Examiner*—Kenneth J. Ramsey
(74) *Attorney, Agent, or Firm*—Heller Ehrman White & McAuliffe LLP

(57) ABSTRACT

This invention relates to a method of manufacturing a micro-cup array. Such an array may find use in a number of applications such as, for example, a video display. The micro-cups find particular use in electrophoretic or liquid crystal displays.

30 Claims, 7 Drawing Sheets

U.S. PATENT DOCUMENTS

| | | | | |
|---|---|---|---|---|
| 4,741,988 A | * | 5/1988 | Van der Zande et al. | 430/312 |
| 4,891,245 A | | 1/1990 | Micale | 427/213.3 |
| 5,200,120 A | * | 4/1993 | Sakai | 264/1.33 |
| 5,276,438 A | | 1/1994 | DiSanto et al. | |
| 5,279,511 A | | 1/1994 | DiSanto et al. | |
| 5,380,362 A | | 1/1995 | Schubert | |
| 5,403,518 A | | 4/1995 | Schubert | |
| 5,573,711 A | | 11/1996 | Hou et al. | |
| 5,699,097 A | * | 12/1997 | Takayama et al. | 347/171 |
| 5,731,860 A | | 3/1998 | Harada et al. | |
| 5,895,541 A | | 4/1999 | Kobayashi et al. | |
| 5,914,806 A | | 6/1999 | Gordon II et al. | |
| 5,930,026 A | | 7/1999 | Jacobson et al. | 359/296 |
| 5,942,154 A | | 8/1999 | Kim et al. | 252/299.01 |
| 5,961,804 A | | 10/1999 | Jacobson et al. | 204/606 |
| 5,985,084 A | | 11/1999 | Summersgill et al. | |
| 6,017,584 A | | 1/2000 | Albert et al. | 427/213.3 |
| 6,064,508 A | | 5/2000 | Forgette et al. | |
| 6,067,185 A | * | 5/2000 | Albert et al. | 359/296 |
| 6,113,810 A | * | 9/2000 | Hou et al. | 252/572 |
| 6,113,836 A | * | 9/2000 | Sakai et al. | 264/400 |
| 6,120,588 A | | 9/2000 | Jacobson | |
| 6,120,839 A | * | 9/2000 | Comiskey et al. | 427/213.3 |
| 6,172,798 B1 | | 1/2001 | Albert et al. | |
| 6,184,856 B1 | * | 2/2001 | Gordon, II et al. | 345/107 |
| 6,239,896 B1 | | 5/2001 | Ikeda | |
| 6,312,304 B1 | | 11/2001 | Duthaler et al. | |
| 6,327,072 B1 | | 12/2001 | Comiskey et al. | |
| 6,337,761 B1 | * | 1/2002 | Rogers et al. | 359/296 |
| 6,392,785 B1 | | 5/2002 | Albert et al. | |
| 6,392,786 B1 | | 5/2002 | Albert | |
| 6,400,430 B2 | | 6/2002 | Nakao et al. | |
| 6,400,492 B1 | * | 6/2002 | Morita et al. | 359/296 |
| 6,512,626 B1 | * | 1/2003 | Schmidt | 359/296 |
| 6,514,328 B1 | * | 2/2003 | Katoh et al. | 106/31.28 |
| 6,525,865 B2 | | 2/2003 | Katase | 359/296 |
| 2002/0126249 A1 | | 9/2002 | Liang et al. | 349/187 |
| 2002/0182544 A1 | | 12/2002 | Chan-Park et al. | 430/311 |

OTHER PUBLICATIONS

U.S. patent Ser. No. 09/518,488, filed Mar. 3, 2000 (Available upon request).

Ota, et al., "Electrophoretic Image Display (EPID) Panel," *Wireless Research Laboratory, Matsushita Electric Industrial Company, Ltd., Osaka, 571, Japan*, Feb. 7, 1973.

Andre W. L. Dalisa, "Electrophoretic Display Technology," *Philips Laboratories, Briarcliff Manor, NY 10510*, Revised Mar. 8, 1977.

Murau and Singer, "The understanding and elimination of some suspension instabilities in an electrophoretic display," *Philips Laboratories, Briarcliff Manor, NY 10510*, Apr. 10, 1978.

Nakamura, et al., "Development of Electrophoretic Display Using Microcapsulated Suspension," *NOK Corporation, Kanagawa, Japan & NOK Corporation, Ibaraki, Japan*.

J. C. Lewis, "Electrophoretic Displays," *Allen Clark Research Centre, The Plessey Company Limited, Caswell, Towcester, Northants, England*.

Comiskey, et al., "An electrophoretic ink for all–printed reflective electronic displays," *Letters to Nature*, MIT, The Media Laboratory, 20 Ames street, Cambridge, MA 02139–4307, USA May, 1998.

Dalisa, A.L., "Electophoretic Display Technology", *IEEE Trans. Electron Devices* —24:827–834 (1977).

Harbour, J.R. et al., "Subdivided Electrophoretic Display," *Xerox Disclosure Journal, US, Xerox Corporation, Stamford, Conn.*—4(6):705 Nov. 1979 (XP002123212) the whole document.

Harvey, T.G., "Replication techniques for micro–optics", *SPIE Proc.*—3099:76–82 (1997).

Mürau, p., et al., "The understanding and elimination of some suspension instabilities in an electrophoretic display", *J. Appl. Phys.*—49(9):4829 (1978).

Slafer, W.D., et al., "Continuous Manufacturing of Thin Cover Sheet Optical Media", *SPIE Proc.* —1663:324–334 (1992).

* cited by examiner

Transfer Molding with Resin Dispensed on Mold

Schematic of Cast Micro-cups (Q is Quartran)

MANUFACTURING PROCESS FOR ELECTROPHORETIC DISPLAY

This is a continuation in part of U.S. application Ser. No. 09/518,488 filed on Mar. 3, 2000 and entitled "An Improved Electrophoretic Display and Novel Process for Its Manufacture" which is incorporated by reference herein.

FIELD

The present invention relates generally to the field of electrophoretic displays and, specifically, to a novel method of manufacturing such displays.

BACKGROUND

The electrophoretic display is a non-emissive device based on the electrophoresis phenomenon of charged pigment particles suspended in a solvent. It was first proposed in 1969. The display usually comprises two plates with electrodes placed opposing each other, separated by using spacers. One of the electrodes is usually transparent. A suspension composed of a colored solvent and charged pigment particles is enclosed between the two plates. When a voltage difference is imposed between the two electrodes, the pigment particles migrate to one side and then either the color of the pigment or the color of the solvent can be seen according to the polarity of the voltage difference.

In order to prevent undesired movement of the particles, such as sedimentation, partitions between the two electrodes were proposed for dividing the space into smaller cells. However, in the case of partition-type electrophoretic displays, some difficulties were encountered in the formation of the partitions and the process of enclosing the suspension. Furthermore, it was also difficult to keep different colors of suspensions separate from each other in the partition-type electrophoretic display.

Subsequently, attempts were made to enclose the suspension in microcapsules. U.S. Pat. Nos. 5,961,804 and 5,930,026 describe microencapsulated electrophoretic displays. The reference display has a substantially two dimensional arrangement of microcapsules each having therein an electrophoretic composition of a dielectric fluid and a suspension of charged pigment particles that visually contrast with the dielectric solvent. The microcapsules can be formed by interfacial polymerization, in-situ polymerization or other known methods such as physical processes, in-liquid curing or simple/complex coacervation. The microcapsules, after their formation, may be injected into a cell housing two spaced-apart electrodes, or "printed" into or coated on a transparent conductor film. The microcapsules may also be immobilized within a transparent matrix or binder that is itself sandwiched between the two electrodes.

The electrophoretic displays prepared by these prior art processes, in particular the microencapsulation process as disclosed in U.S. Pat. Nos. 5,930,026, 5,961,804, and 6,017, 584, have many shortcomings. For example, the electrophoretic display manufactured by the microencapsulation process suffers from sensitivity to environmental changes (in particular sensitivity to moisture and temperature) due to the wall chemistry of the microcapsules. Secondly the electrophoretic display based on the microcapsules has poor scratch resistance due to the thin wall and large particle size of the microcapsules. To improve the handleability of the display, microcapsules are embedded in a large quantity of polymer matrix which results in a slow response time due to the large distance between the two electrodes and a low contrast ratio due to the low payload of pigment particles. It is also difficult to increase the surface charge density on the pigment particles because charge-controlling agents tend to diffuse to the water/oil interface during the microencapsulation process. The low charge density or zeta potential of the pigment particles in the microcapsules also results in a slow response rate. Furthermore, because of the large particle size and broad size distribution of the microcapsules, the prior art electrophoretic display of this type has poor resolution and addressability for color applications.

To prevent undesired movements of the particles such as lateral migration or sedimentation, partition of the electrophoretic display into smaller cells by photolithographic process has been reported. The process in the prior art is batchwise and requires solvent development. A roll-to-roll microembossing process has also been disclosed. It is desirable to have a high throughput method of manufacture for micro-cups used in electrophoretic or liquid crystal displays that does not require a solvent.

SUMMARY

The present invention is directed to a method of manufacture for an array of micro-cups and uses for the micro-cup array.

In one aspect of the invention there is a method utilizing a pre-patterned male mold that is coated with a thermoplastic or thermoset precursor composition (such as, for example, a UV curable resin) to form a micro-cup array. The resin is then contacted with a transfer sheet (or plastic substrate) having a patterned conducting layer and, optionally, heated. The mold is registered to the conductor pattern. A uniform pressure may be applied to the transfer sheet to aid in improving adhesion between the transfer sheet and the resin and control the thickness of the floor of the micro-cups. The resin is cured by exposure to radiation such as UV light. Once cured the resin is released from the male mold to yield the array of micro-cups. Optionally, the male mold may be pre-coated with a release coating such as wax, silicone or fluorinated polymer. If necessary, the micro-cup array may be post-cured.

In a second aspect of the invention there is provided a method of manufacture of an electrophoretic display using the micro-cup array. The process for the manufacture of a full color electrophoretic display comprises laminating the preformed microcups with a layer of positively working photoresist, selectively opening a certain number of the microcups by imagewise exposing the positive photoresist, followed by developing the resist, filling the opened cups with a colored electrophoretic fluid, and sealing the filled microcups by a sealing process. These steps may be repeated to create sealed microcups filled with electrophoretic fluids of different colors.

In a third aspect of the invention there is provided an electrophoretic display using the micro-cup array. The micro-cup array is filled with a dielectric fluid containing at least a charged pigment suspension in a colored dielectric solvent or solvent mixture. The micro-cups are then sealed. The sealed array is laminated with a conductor film pre-coated with an adhesive layer.

DETAILED DESCRIPTION

The invention will now be described in detail by way of reference only using the following definitions and examples. All patents and publications referred to herein are expressly incorporated by reference.

Definitions

Unless defined otherwise in this specification, all technical terms are used herein according to their conventional definitions as they are commonly used and understood by those of ordinary skill in the art. As used herein, the following terms or abbreviations, whether used in the singular or plural, will have the meanings indicated:

The term "micro-cup" refers to the cup-like indentations created by transfer casting.

The term "cell", in the context of the present invention, is intended to mean the single unit formed from a sealed micro-cup. The cells are filled with charged pigment particles dispersed in a solvent or solvent mixture.

The term "well-defined", when describing the micro-cups or cells, is intended to indicate that the micro-cup or cell has a definite shape, size and aspect ratio which are predetermined according to the specific parameters of the manufacturing process.

The term "aspect ratio" is a commonly known term in the art of electrophoretic displays. In this application, it refers to the depth to width or depth to length ratio of the micro-cups.

Preferred Embodiments

Figure 1:
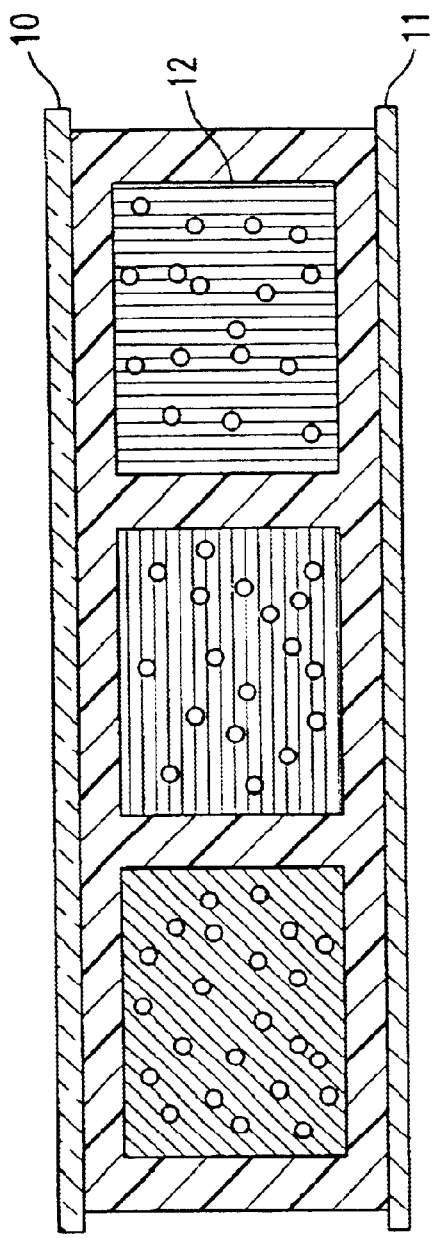
FIG. 1 is a schematic depiction of the electrophoretic display of the present invention.

An electrophoretic display of the present invention, as shown in FIG. 1, comprises two electrode plates (10, 11), at least one of which is transparent (10), and a layer of well-defined cells (12) enclosed between the two electrodes. The cells are of well-defined shape and size and are filled with charged pigment particles dispersed in a colored dielectric solvent. When a voltage difference is imposed between the two electrodes, the charged particles migrate to one side, such that either the color of the pigment or the color of the solvent is seen through the transparent conductor film. At least one of the two conductors is patterned. The process for the preparation of such an electrophoretic display involves several aspects.

I. Preparation of the Micro-cups

Preparation of the Male Mold

Figure 2:
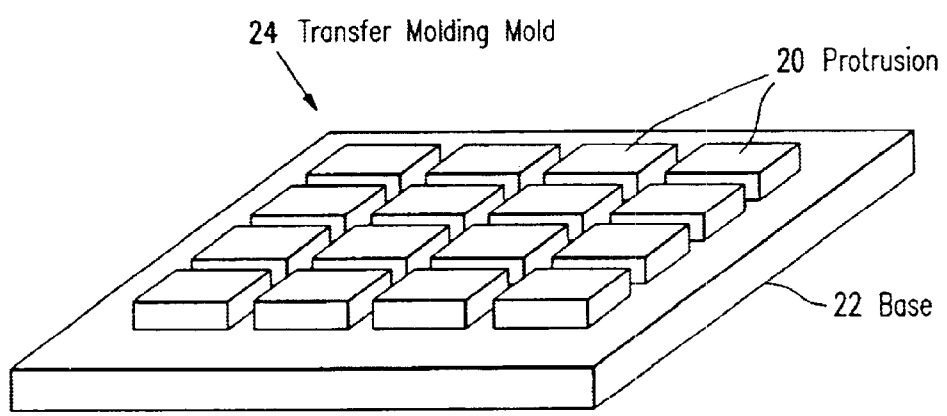
FIG. 2 is a schematic depiction of the Transfer Mold, i.e., male mold.

The male mold (24) may be prepared by any appropriate method such as, for example, a photoresist process followed by either etching or electroplating. A representative example of the male mold is given in FIG. 2. A master template for the male mold may be manufactured by any appropriate method, such as, for example, electroplating. With electroplating, a glass base is sputtered with a thin layer (typically 3000 Å) of a seed metal such as chrome inconel. It is then coated with a layer of photoresist and exposed to UV. A mask is placed between the UV and the layer of photoresist. The exposed areas of the photoresist become hardened. The unexposed areas are then removed by washing them with an appropriate solvent. The remaining hardened photoresist is dried and sputtered again with a thin layer of seed metal. A master is then ready for electroforming. A typical material used for electroforming is nickel cobalt. Alternatively, the master can be made of nickel by nickel sulfamate electroforming or electroless nickel deposition as described in "Continuous manufacturing of thin cover sheet optical media", SPIE Proc. Vol. 1663, pp.324 (1992). The floor of the mold (22) is typically between about 50 to 400 microns. The master can also be made using other microengineering techniques including e-beam writing, dry etching, chemical etching, laser writing or laser interference as described in "Replication techniques for micro-optics", SPIE Proc. Vol.3099, pp76–82 (1997). Alternatively, the mold can be made by photomachining using plastics, ceramics or metals.

The male mold (24) thus prepared typically has protrusions. (20) between about 1 to 500 microns, preferably between about 2 to 100 microns, and most preferred being about 4 to 50 microns. The male mold may be in the form of a belt, a roller, or a sheet. For continuous manufacturing, the belt type of mold is preferred.

Micro-cup Formation

Figure 3:
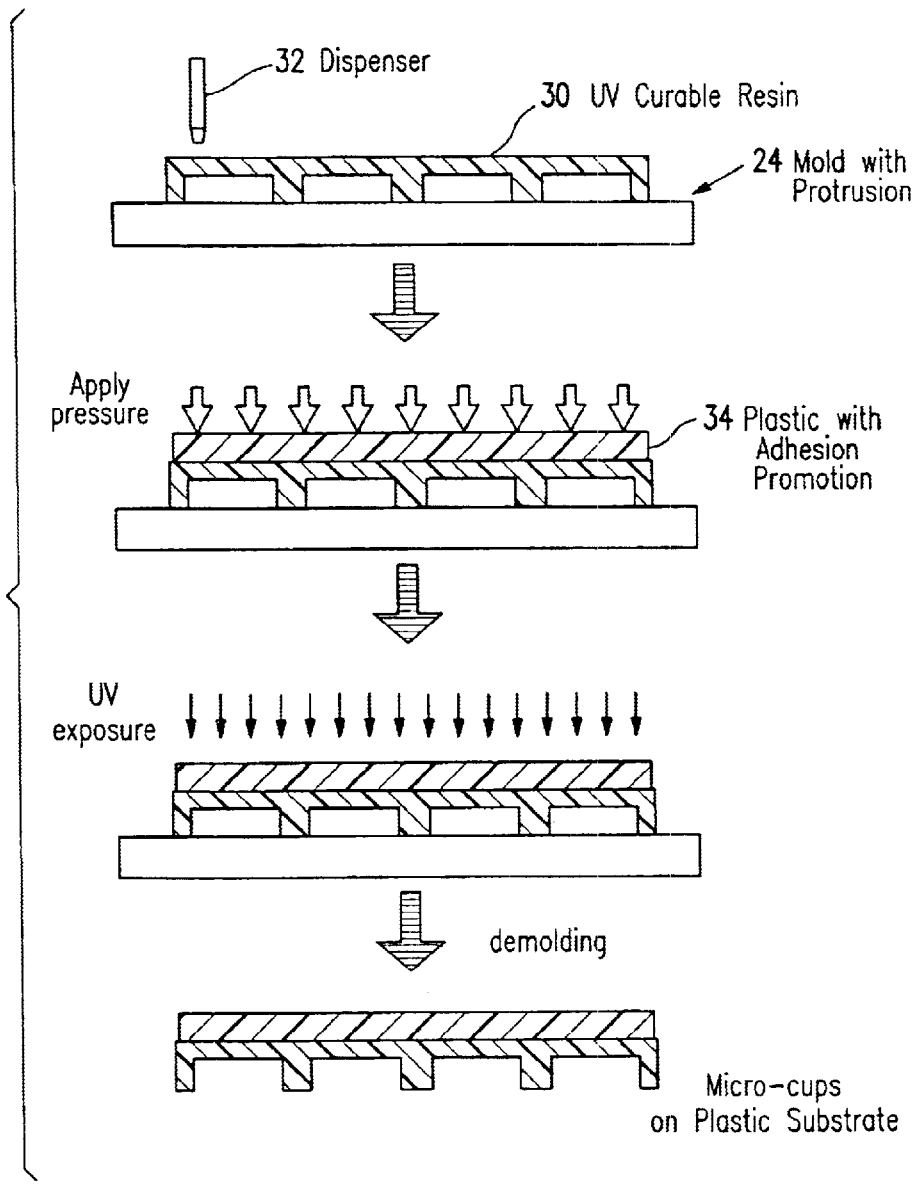
FIG. 3 is a representation of a manufacturing process by transfer casting a UV curable composition onto a male mold.

Micro-cups may be formed either in a batchwise process or in a continuous roll-to-roll process. The latter offers a continuous low cost, high throughput manufacturing technology for production of compartments for use in electrophoretic or liquid crystal displays. The process is represented in FIG. 3. Prior to applying the UV curable resin, the mold may be prepared with a mold release to aid in the demolding process, if desired or necessary. The UV curable resin (30) may be degassed prior to dispensing and may optionally contain a solvent. The solvent, if present, readily evaporates. The UV curable resin (30) is dispensed by any appropriate means such as, for example, coating, dipping, pouring and the like, over the male mold (24). The dispenser (32) may be moving or stationary. A plastic substrate or transfer sheet with adhesion promotion properties (34) is overlaid on the UV curable resin.

The thermoplastic or thermoset precursor for the preparation of the microcups may be multifunctional acrylate or methacrylate, vinylether, epoxide and their oligomers, polymers and the like. Multifunctional acrylate and their oligomers are the most preferred. A combination of multifunctional epoxide and multifunctional acrylate is also very useful to achieve desirable physico-mechanical properties. A crosslinkable oligomer imparting flexibility, such as urethane acrylate or polyester acrylate, is usually also added to improve the flexure resistance of the embossed micro-cups. The composition may contain polymer, oligomer, monomer and additives or only oligomer, monomer and additives. Examples of suitable resins include, but are not limited to, acrylics, polyesters such as polyethylene terephthalate and polyethylene naphthate, polyaramids, polyamides, polyimides, polyolefins, polysulfones, epoxy and their composites. Additional resins are polyvalent acrylate or methacrylate, polyvalent vinyls including vinylbenzene, vinylsilane, vinylether, polyvalent epoxide, polyvalent allyl and oligomers, polymers containing those crosslinkable functional groups and the like.

The glass transition temperatures (or Tg) for this class of materials usually range from about −70° C. to about 150° C., preferably from about −20° C. to about 50° C. The microembossing process is typically carried out at a temperature higher than the Tg. A heated male mold or a heated housing substrate against which the mold presses may be used to control the microembossing temperature and pressure.

Suitable plastics are polyethylene terephthalate, polyethylene naphthate, polycarbonate, polyvinyl fluoride, polyararmid, polyimide, polycycloolefin, polysulfone, epoxy, and their composites. Pressure may be applied, if necessary, to ensure proper bonding between the resin and the plastic and control the thickness of the floor of the micro-cups. The pressure may be applied using a laminating roller, vacuum molding, press device or any other like means. If the male mold is metallic and opaque, the plastic substrate is typically transparent to the actinic radiation used to cure the resin. Conversely, the male mold can be transparent and the plastic substrate can be opaque to the actinic radiation. To obtain good transfer of the molded features onto the transfer sheet, the plastic substrate needs to have good adhesion to the UV curable resin. Optionally, the mold or the precursor compostion, for example the curable resin, may be heated from between 40° C. to about 200° C.

II. Preparation of the Suspension/Dispersion

The micro-cups are filled with charged pigment particles dispersed in a dielectric solvent. The dispersion may be prepared according to methods well known in the art such as U.S. Pat. Nos. 6,017,584, 5,914,806, 5,573,711, 5,403,518, 5,380,362, 4,680,103, 4,285,801, 4,093,534, 4,071,430, 3,668,106 and *IEEE Trans. Electron Devices*, ED-24, 827 (1977), and *J. Appl. Phys.* 49(9), 4820 (1978). The charged pigment particles visually contrast with the medium in which the particles are suspended. The medium is a dielectric solvent which preferably has a low viscosity and a dielectric constant in the range of about 2 to about 30, preferably about 2 to about 15 for high particle mobility. Examples of suitable dielectric solvents include hydrocarbons such as decahydronaphthalene (DECALIN), 5-ethylidene-2-norbornene, fatty oils, paraffin oil, aromatic hydrocarbons such as toluene, xylene, phenylxylylethane, dodecylbenzene and alkylnaphthalene, halogenated solvents such as perfluorodecalin, perfluorotoluene, perfluoroxylene, dichlorobenzotrifluoride, 3,4,5-trichlorobenzotrifluoride, chloropentafluoro-benzene, dichlorononane, pentachlorobenzene, and perfluoro solvents such as FC-43, FC-70 and FC-5060 from 3M Company, St. Paul Minn., low molecular weight halogen containing polymers such as poly(perfluoropropylene oxide) from TCI America, Portland, Oreg., poly(chlorotrifluoroethylene) such as Halocarbon Oils from Halocarbon Product Corp., River Edge, N.J., perfluoropolyalkylether such as Galden from Ausimont or Krytox Oils and Greases K-Fluid Series from DuPont, Del. In one preferred embodiment, poly(chlorotrifluoroethylene) is used as the dielectric solvent. In another preferred embodiment, poly(perfluoropropylene oxide) is used as the dielectric solvent.

The suspending medium may be colored by dyes or pigments. Nonionic azo and anthraquinone dyes are particularly useful. Examples of useful dyes include, but are not limited to: Oil Red EGN, Sudan Red, Sudan Blue, Oil Blue, Macrolex Blue, Solvent Blue 35, Pylam Spirit Black and Fast Spirit Black from Pylam Products Co., Arizona, Sudan Black B from Aldrich, Thermoplastic Black X-70 from BASF, anthroquinone blue, anthroquinone yellow 114, anthroquinone red 111, 135, anthroquinone green 28 from Aldrich. In case of an insoluble pigment, the pigment particles for generating the color of the medium may also be dispersed in the dielectric medium. These color particles are preferably uncharged. If the pigment particles for generating color in the medium are charged, they preferably carry a charge which is opposite from that of the charged pigment particles. If both types of pigment particles carry the same charge, then they should have different charge density or different electrophoretic mobility. In any case, the dye or pigment for generating color of the medium must be chemically stable and compatible with other components in the suspension. Additionally, polymeric dyes, such as dye grafted polymer, or grafted dyes such as dye grafted with oligomer/monomer may be used.

The charged pigment particles may be organic or inorganic pigments, such as $TiO_2$, phthalocyanine blue, phthalocyanine green, diarylide yellow, diarylide AAOT Yellow, and quinacridone, azo, rhodamine, perylene pigment series from Sun Chemical, Hansa yellow G particles from Kanto Chemical, and Carbon Lampblack from Fisher. Submicron particle size is preferred. The particles should have acceptable optical characteristics, should not swollen or softened by the dielectric solvent, and should be chemically stable. The resulting suspension must also be stable against sedimentation, creaming or flocculation under normal operating conditions.

The pigment particles may exhibit a native charge, or may be charged explicitly using a charge control agent, or may acquire a charge when suspended in the dielectric solvent. Suitable charge control agents are well known in the art; they may be polymeric or non-polymeric in nature, and may also be ionic or non-ionic, including ionic surfactants such as Aerosol OT, sodium dodecylbenzenesulfonate, OLOA 1200 from Chevron Chemical Co., metal soaps such as basic calcium petroleum sulphonate, basic calcium alkyl salicylate, zinc alkyl salicylate, alkyl diphenyloxide disulfonate (Dowfax surfactants from Dow Chemical), polybutene succinimide, maleic anhydride copolymers, vinylpyridine copolymers, vinylpyrrolidone copolymer (such as Ganex from International Specialty Products), (meth)acrylic acid copolymers, N,N-dimethylaminoethyl (meth)acrylate copolymers. Fluorosurfactants are particularly useful as charge controlling agents in perfluorocarbon solvents. These include FC fluorosurfactants such as FC-170C, FC-171, FC-176, FC430, FC431 and FC-740 from 3M Company and Zonyl fluorosurfactants such as Zonyl FSA, FSE, FSN, FSN-100, FSO, FSO-100, FSD and UR from Dupont.

Suitable charged pigment dispersions may be manufactured by any of the well-known methods including grinding, milling, attriting, microfluidizing, and-ultrasonic techniques. For example, pigment particles in the form of a fine powder are added to the suspending solvent and the resulting mixture is ball milled or attrited for several hours to break up the highly agglomerated dry pigment powder into primary particles. Although less preferred, a dye or pigment for generating color of the suspending medium may be added to the suspension during the ball milling process.

Sedimentation or creaming of the pigment particles may be eliminated by microencapsulating the particles with suitable polymers to match the specific gravity to that of the dielectric solvent. Microencapsulation of the pigment particles may be accomplished chemically or physically. Typical microencapsulation processes include interfacial polymerization, in-situ polymerization, phase separation, coacervation, electrostatic coating, spray drying, fluidized bed coating and solvent evaporation.

For a black/white electrophoretic display, the suspension comprises charged white particles of titanium oxide ($TiO_2$) dispersed in a black solvent or charged black particles dispersed in a dielectric solvent. A black dye or dye mixture such as Pylam Spirit Black and Fast Spirit Black from Pylam Products Co. Arizona, Sudan Black B from Aldrich, Thermoplastic Black X-70 from BASF, or an insoluble black pigment such as carbon black may be used to generate the black color of the solvent. For other colored suspensions, there are many possibilities. For a subtractive color system, the charged, $TiO_2$ particles may be suspended in a dielectric solvent of cyan, yellow or magenta color. The cyan, yellow or magenta color may be generated via the use of a dye or a pigment. For an additive color system, the charged $TiO_2$ particles may be suspended in a dielectric solvent of red, green or blue color generated also via the use of a dye or a pigment. The red, green, blue color system is preferred for most applications.

III. Sealing of the Micro-cups

The sealing of the micro-cups may be accomplished in a number of ways. A preferred approach is to disperse a UV curable composition containing multifunctional acrylates, acrylated oligomers, and photoinitiators into an electrophoretic fluid containing charged pigment particles dispersed in a colored dielectric solvent. The UV curable composition is immiscible with the dielectric solvent and has a specific gravity lower than that of the dielectric solvent and the pigment particles. The two components, UV curable composition and the electrophoretic fluid, are thoroughly blended in an in-line mixer and immediately coated onto the micro-cups with a precision coating mechanism such as Myrad bar, gravure, doctor blade, slot coating or slit coating. Excess fluid is scraped away by a wiper blade or a similar device. A small amount of a weak solvent or solvent mixture such as isopropanol, methanol, or their aqueous solutions may be used to clean the residual electrophoretic fluid on the top surface of the partition walls of the micro-cups. Volatile organic solvents may be used to control the viscosity and coverage of the electrophoretic fluid. The thus-filled micro-cups are then dried and the UV curable composition floats to the top of the electrophoretic fluid. The micro-cups may be sealed by curing the supernatant UV curable layer during or after it floats to the top. UV or other forms of radiation such as visible light, IR and electron beam may be used to cure and seal the micro-cups. Alternatively, heat or moisture may also be employed to cure and seal the micro-cups, if appropriate, heat or moisture curable compositions may be used.

A preferred group of dielectric solvents exhibiting desirable density and solubility discrimination against acrylate monomers and oligomers are halogenated hydrocarbons and their derivatives. Surfactants may be used to improve the adhesion and wetting at the interface between the electrophoretic fluid and the sealing materials. Useful surfactants include the FC surfactants from 3M Company, Zonyl fluorosurfactants from DuPont, fluoroacrylates, fluoromethacrylates, fluoro-substituted long chain alcohols, perfluoro-substituted long chain carboxylic acids and their derivatives.

Alternatively, the electrophoretic fluid and the sealing precursor may be coated sequentially into the micro-cups, if the sealing precursor is at least partially compatible with the dielectric solvent. Thus, the sealing of the micro-cups may be accomplished by overcoating a thin layer of thermoset precursor which is curable by radiation, heat, moisture or interfacial reactions and curing on the surface of the filled micro-cups. Interfacial polymerization followed by UV curing is very beneficial to the sealing process. Intermixing between the electrophoretic layer and the overcoat is significantly suppressed by the formation of a thin barrier layer at the interface by interfacial polymerization. The sealing is then completed by a post curing step, preferably by UV radiation or other actinic radiation. To further reduce the degree of intermixing, it is highly desirable that the specific gravity of the overcoating is significantly lower than that of the electrophoretic fluid. Volatile organic solvents may be used to adjust the viscosity and the thickness of the coatings. When a volatile solvent is used in the overcoat, it is preferred that it is immiscible with the dielectric solvent. The two-step overcoating process is particularly useful when the dye used is at least partially soluble in the thermoset precursor.

IV. Preparation of Monochrome Electrophoretic Displays

Figure 4:
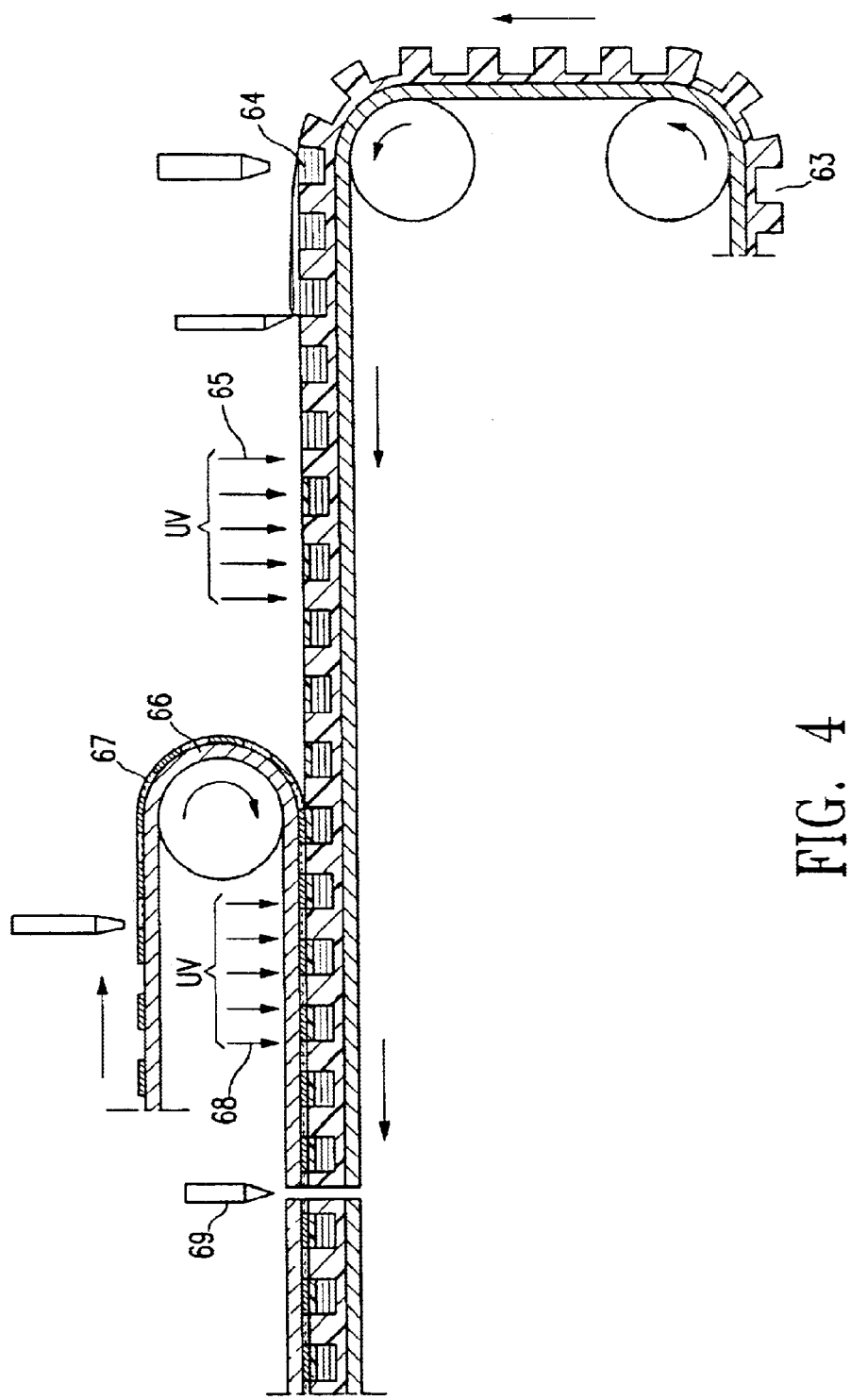
FIG. 4 is a flow chart for manufacturing a black/white electrophoretic display or other single color electrophoretic display.

The process is illustrated by the flow diagram as shown in FIG. 4. All micro-cups are filled with a suspension of the same color composition. The process can be a continuous roll-to-roll process comprising the following steps:

1. Micro-cups are prepared as described above. Briefly, micro-cups are manufatured by transfer casting a UV curable composition onto a male mold, curing the composition, and demolding of the formed parts using a transfer sheet. The process may be batchwise or roll-to-roll.
2. Release the mold from the cured resin layer preferably during or after it is hardened by proper means.
3. Fill in the thus-formed array of micro-cups (63) with a charged pigment dispersion (64) in a colored dielectric solvent containing at least a thermoset precursor which is incompatible with the solvent and has a lower specific gravity than the solvent and the pigment particles.
4. Seal the micro-cups by curing the thermoset precursor preferably by radiation such as UV (65), or by heat or moisture during or after the thermoset precursor separates and forms a supernatant layer on top of the liquid phase, thus forming closed electrophoretic cells containing pigment dispersion in a colored dielectric solvent.
5. Laminate the sealed array of electrophoretic cells with a second conductor film (66) pre-coated with an adhesive layer (67) which may be a pressure sensitive adhesive, a hot melt adhesive, a heat, moisture, or radiation curable adhesive.

The laminate adhesive may be post cured by radiation such as UV (68) through the top conductor film if the latter is transparent to the radiation. The finished product may be cut (69) and assembled after the lamination step.

The preparation of the micro-cups described above can be conveniently replaced by the alternative procedure of batchwise manufacture. The sealing of the micro-cups may alternatively be accomplished by directly overcoating and curing a layer of the thermoset precursor composition over the surface of the electrophoretic fluid.

V. Preparation of Multi-color Electrophoretic Displays

For the manufacture of a multi-color electrophoretic display, additional steps are needed to generate micro-cups containing suspensions of different colors. These additional steps include (1) laminating the already formed micro-cups with a positively working dry-film photoresist consisting of at least a removable support such as PET-4851 from Saint-Gobain, Worcester, Mass., a novolac positive photoresist such as Microposit S1818 from Shipley, and an alkali-developable adhesive layer such as a mixture of Nacor 72-8685 from National Starch and Carboset 515 from BF Goodrich; (2) selectively opening a certain amount of the micro-cups by imagewise exposing the photoresist, removing the removable support film, and developing the positive photoresist with a developer such as diluted Microposit 351 developer from Shipley; (3) filling the opened cups with the electrophoretic fluid containing charged white pigment ($TiO_2$) particles and dye or pigment of the first primary color; and (4) sealing the filled micro-cups as described in the preparation of monochrome displays. These additional steps may be repeated to create micro-cups filled with electrophoretic fluid of the second and the third primary colors.

Figure 5A:
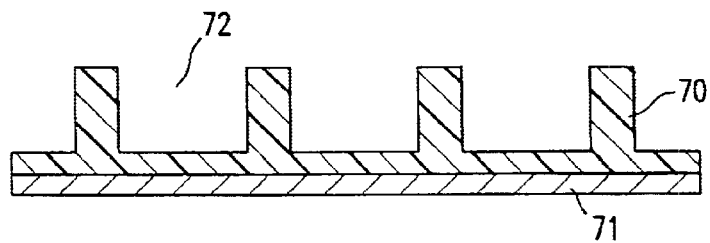
FIG. 5 is a flow chart-for manufacturing a multi-color electrophoretic display.
Figure 5B:
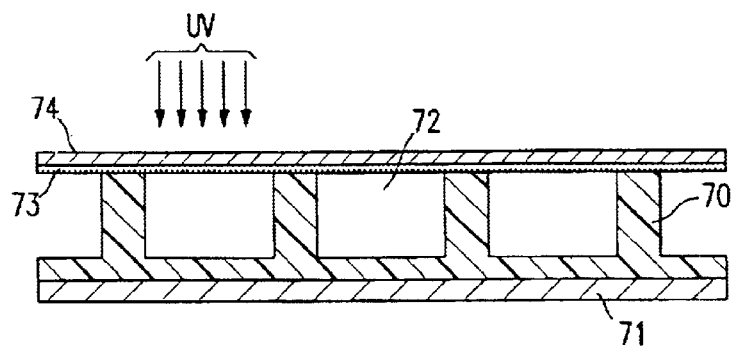
Figure 5C:
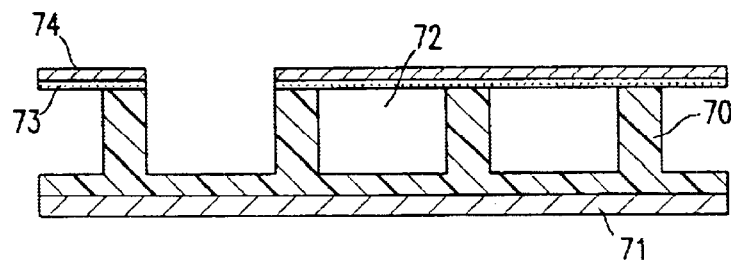
Figure 5D:
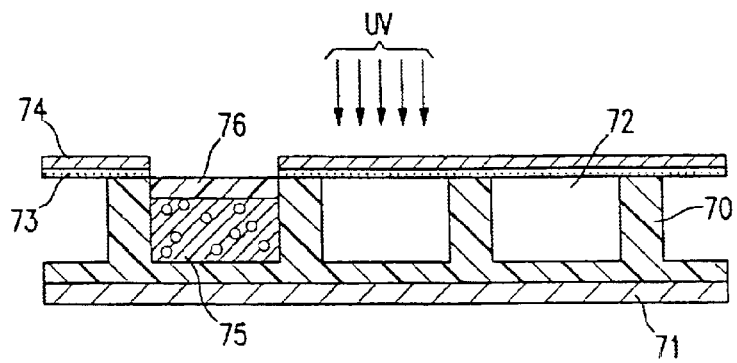
Figure 5E:
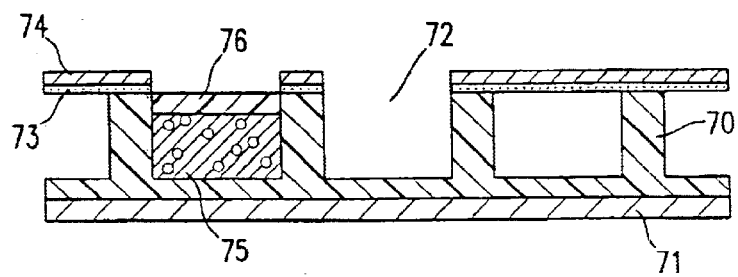
Figure 5F:
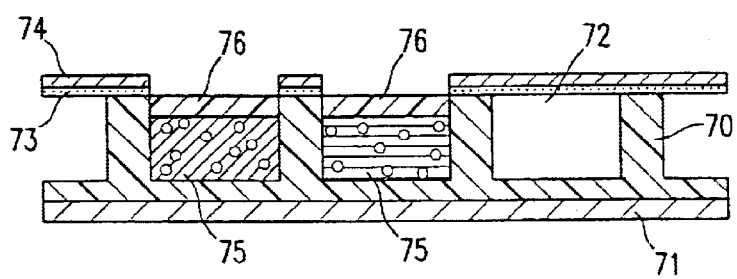
Figure 5G:
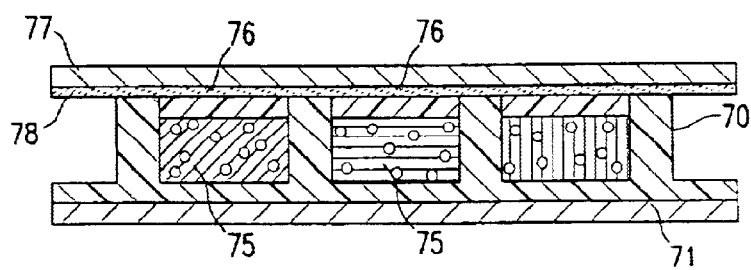

More specifically, a multi-color electrophoretic displays may be prepared according to the steps as shown in FIG. 5:

1. Manufacture micro-cups using a UV curable resin (70) on a conductor film (71) as previously described above.
2. Release the mold from the cured resin layer preferably during or after it is hardened.
3. Laminate the thus formed array of micro-cups (72) with a positive dry-film photoresist which comprises at least an adhesive layer (73), a positive photoresist (74) and a removable plastic cover sheet (not shown).
4. Imagewise expose (FIG. 5*c*) the positive photoresist by UV, visible light, or other radiation, remove the cover sheet, develop and open cups in the exposed area. The purpose of Steps 4 and 5 is to selectively open the micro-cups in a predetermined area (FIG. 5*d*).
5. Fill in the opened micro-cups with a charged white pigment dispersion (75) in a dielectric solvent containing at least a dye or pigment of the first primary color and a thermoset precursor (76) which is incompatible with the solvent and has a lower specific gravity than the solvent and the pigment particles.
6. Seal the micro-cups to form closed electrophoretic cells containing electrophoretic fluid of the first primary color by curing the thermoset precursor by heat, moisture or radiation such as UV during or after the thermoset precursor separates and forms a supernatant layer on top of the liquid phase (FIG. 5*e*). UV curing is preferred for the sealing step.
7. Steps 5–7 described above may be repeated to generate well-defined cells containing electrophoretic fluids of different colors in different areas (FIGS. 5*e*–5*g*).
8. Laminate the sealed array of electrophoretic cells in registration to a second, pre-patterned transparent conductor film (77) pre-coated with an adhesive layer (78) which may be a pressure sensitive adhesive, a hot melt adhesive, a heat, moisture, or radiation curable adhesive.
9. Harden the adhesive.

The preparation of the micro-cups described in the process above can conveniently be replaced by the alternative procedure of batchwise manufacture. The sealing of the micro-cups may be alternatively accomplished by directly coating a layer of a thermoset precursor material over the surface of the liquid phase.

The thickness of the display produced by the present processes as described can be as thin as a piece of paper. The width of the display is the width of the coating web (typically 3–90 inches). The length of the display can be anywhere from inches to thousands of feet depending on the size of the roll.

EXAMPLES

The following preparations and examples are given to enable those skilled in the art to more clearly understand and to practice the present invention. They should not be considered as limiting the scope of the invention, but merely as being illustrative and representative thereof.

Example 1

Preparation of Liquid Formulations for Micro-cups

The liquid formulations used are shown in Table 1. The liquid formulation was gassed using ultrasonics for 10 minutes prior to use. Formulation X-021 produced micro-cups with a thicker bottom floor than formulations X-023 or X-024.

TABLE 1

Formulation for transfer molding

| Ingredient No. (Supplier) | Description | X-021 | X-023 | X-024 |
|---|---|---|---|---|
| 1 Ebecryl 3605 (UCB Chemicals) | Epoxy acrylate | 56.07 | 53.67 | 48.60 |
| 2 Ebecryl 4827 (UCB Chemicals) | Urethane acrylate | 11.21 | 10.73 | 9.72 |
| 3 HDODA (UCB Chemicals) | Monomer | 28.04 | 26.84 | 33.43 |
| 4 Ebecryl 1360 (UCB Chemicals) | Slip agent | 0.00 | 4.29 | 4.20 |
| 5 Irgacure 500 (Ciba Specialty Chemicals Corp.) | Photoinitiator | 4.67 | 4.47 | 4.05 |
| Total | | 100.00 | 100.00 | 100.00 |

The liquid formulations are conveniently dispensed using a moving or stationery dispenser. Using a stationery dispenser, precise doctoring of the coating over the retaining features of the male mold shall follow.

Example 2

Micro-cup Manufacture

Figure 6:
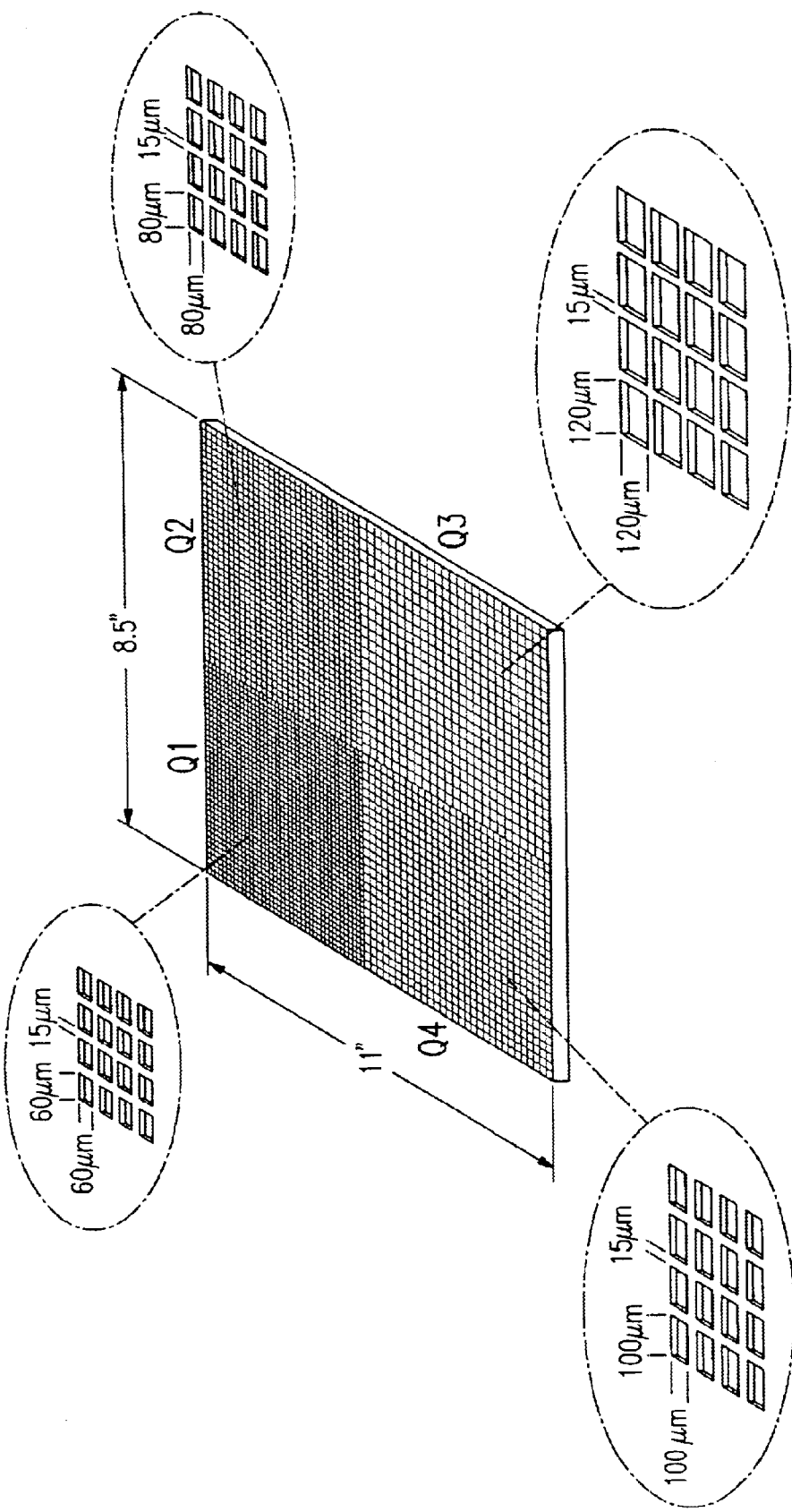
FIG. 6 is a typical micro-cup array prepared by the inventive method.

A male mold with four quartrans was made using lithographic techniques to produce micro-cups of dimensions shown in FIG. 6. The male mold was made primarily of nickel and the protrusions are about 10 μm high. The mold was prepared with a mold release, specifically Frekote® 700-NC. A few drops of the desired liquid formulation (for example, as described in Example 1) were deposited on the male mold using a micro-pipette. A polyethylene terphthalate film (Mylar® or Melinex® film from DuPont) was then laminated on the coated male mold. A GBC laminator with a set of matching rubber rollers was used for the lamination. The temperature of the rollers was set at 60° C., speed at 1–30 ft/min. The coating was exposed to UV light through the PET film for 5 minutes.

Dimensions of the micro-cups made by the technique of this invention are summarized in Table 2. Formulation X-021 produced micro-cups with a thicker bottom floor (about 10 μm); formulations X-023 and X-024 produced a thinner floor (less than about 5 μm).

TABLE 2

Transfer casting on film with various formulations and films

| No. | Sample | Formulation | Film[3] | Quartran | h[1] (μm) | d[2] (μm) |
|---|---|---|---|---|---|---|
| 1 | F021A | X-021 | Melinex 725/500 g | 3 | 8–10 | 10 |
| 2 | F023B | X-023 | Melinex 453/92 g | 2 | 12 | ~0 |
| 3 | F023B | X-023 | Melinex 453/92 g | 1 | 12 | 2 |
| 4 | F024A | X-024 | Melinex 725/500 g | 4 | 11–12 | 4.5 |
| 5 | F024B | X-024 | Melinex 453/92 g | 2 | 12–13 | 1–3 |

[1]h: Height of micro-cup
[2]d: thickness of floor of micro-cup
[3]Film Type/Film Thickness (in gauge)

While the present invention has been described with reference to the specific embodiments thereof, it should be understood by those skilled in the art that various changes may be made and equivalents may be substituted without departing from the true spirit and scope of the invention. In addition, many modifications may be made to adapt a particular situation, materials, compositions, processes, process step or steps, to the objective, spirit and scope of the present invention. All such modifications are intended to be within the scope of the claims appended hereto.

What is claimed is:

1. A process for manufacturing a micro-cup array, comprising:
   a. coating, onto a male mold having an array of protrusions adapted for forming the micro-cup array to be manufactured, a thermoset or thermoplastic precursor composition to form a contiguous precursor layer on the male mold;
   b. contacting the precursor layer with a transfer sheet;
   c. curing the precursor layer to form the micro-cup array; and
   d. releasing the micro-cup array from the male mold.

2. The process of claim 1 wherein said curing is by exposure to heat, moisture, or radiation.

3. The process of claim 1 wherein said precursor composition comprises crosslinkable resins, monomers, oligomers or polymers.

4. The process of claim 3 wherein said crosslinkable resins, monomers, oligomers or polymers are selected from the group consisting of polyvalent acrylate, polyvalent methacrylate, polyvalent vinyl, polyvalent epoxide, polyvalent allyl, and oligomers and polymers containing these crosslinkable functional groups.

5. The process of claim 1 wherein the precursor composition is coated at a temperature near or above its glass transition temperature.

6. The process of claim 5 wherein the glass transition temperature is from about −70° C. to about 150° C.

7. The process of claim 6 wherein the glass transition temperature is from about −20° C. to about 50° C.

8. The process of claim 1 wherein the precursor composition further comprises a plasticizer, organic solvent, or solvent mixture.

9. The process of claim 1 wherein the male mold is selected from the group comprising a belt, a roller, and a sheet.

10. The process of claim 9 wherein the male mold is a belt.

11. The process of claim 1 wherein the male mold or the precursor is heated from between about 40° C. to about 200° C.

12. The process of claim 1 wherein the micro-cup array is post-cured after being released from the male mold.

13. The process of claim 1 wherein the transfer sheet is selected from the group consisting of polyethylene terephthalate, polyethylene naphthalate, polycarbonate, polyvinyl fluoride, polyaramid, polyimide, polycycloolefin, polysulfone, epoxy, and their composites.

14. A process for manufacturing a micro-cup array for an electrophoretic or liquid crystal display, comprising:
   a. coating, onto a male mold having an array of protrusions adapted for forming the micro-cup array to be manufactured, a thermoset or thermoplastic precursor composition to form a contiguous precursor layer on the male mold;
   b. contacting the precursor layer with a transparent substrate having a patterned transparent conductor layer facing the precursor layer;
   c. uniformly applying pressure to the substrate;
   d. curing the precursor layer to form a micro-cup array adherent to the transparent substrate; and
   e. releasing the micro-cup array from the male mold.

15. The process of claim 14 wherein said curing is by exposure to heat, moisture, or radiation.

16. The process of claim 14 wherein said precursor composition comprises crosslinkable resins, monomers, oligomers or polymers.

17. The process of claim 16 wherein said crosslinkable resins, monomers, oligomers or polymers are selected from the group consisting of polyvalent acrylate, polyvalent methacrylate, polyvalent vinyl, polyvalent epoxide, polyvalent allyl, and oligomers and polymers containing these crosslinkable functional groups.

18. The process of claim 14 wherein the precursor composition is coated at a temperature near or above its glass transition temperature.

19. The process of claim 18 wherein the glass transition temperature is from about −70° C. to about 150° C.

20. The process of claim 19 wherein the glass transition temperature is from about −20° C. to about 50° C.

21. The process of claim 14 wherein the precursor composition further comprises a plasticizer, organic solvent, or solvent mixture.

22. The process of claim 14 wherein the male mold is selected from the group comprising a belt, a roller, and a sheet.

23. The process of claim 22 wherein the male mold is a belt.

24. The process of claim 14 wherein the male mold or the precursor is heated from between about 40° C. to about 200° C.

25. The process of claim 14 wherein the micro-cup array is post-cured after being released from the male mold.

26. The process of claim 14 wherein the transparent substrate is selected from the group consisting of polyethylene terephthalate, polyethylene naphthalate, polycarbonate, polyvinyl fluoride, polyaramid, polyimide, polycycloolefin, polysulfone, epoxy, and their composites.

27. The process of claim 14 wherein the patterned transparent conductor layer comprises indium tin oxide lines having a width matched to the protrusions of the male mold.

28. The process of claim 14 herein the pattern of the patterned transparent conductor layer is registered to the protrusions of the male mold.

29. A process for the manufacture of an electrophoretic display, comprising:
   a. preparing an array of micro-cups on a conductor film by coating a layer of thermoset or thermoplastic precursor on a first conductor film followed by forming the array of micro-cups by embossing the precursor layer with a male mold or imagewise exposing the precursor layer and removing the unexposed areas;

b. filling the thus-formed micro-cups with a dielectric fluid containing at least a charged pigment suspension in a dielectric solvent or solvent mixture;

c. sealing the filled micro-cups to form an array of electrophoretic cells; and d. laminating the array of electrophoretic cells, on a side of the array opposite the side facing the first conductor film, with a second conductor film pre-coated with an adhesive layer.

30. A process for the manufacture of a multi-color electrophoretic display, comprising the steps of:

a. preparing an array of micro-cups on a conductor film by coating a layer of thermoset or thermoplastic precursor on a first conductor film followed by forming the array of micro-cups by embossing the precursor layer with a male mold or imagewise exposing the precursor layer and removing the unexposed areas;

b. laminating the array of micro-cups with a layer of positive photoresist to seal the micro-cups;

c. imagewise exposing the positive photoresist to selectively open the micro-cups in a predetermined area;

d. filling the opened micro-cups with a dielectric fluid comprising at least a white pigment dispersion in a dielectric solvent or solvent mixture containing a dye or pigment dispersion of a first color;

e. sealing the filled micro-cups to form electrophoretic cells;

f. repeating steps c) to e) in different areas of the array using dielectric fluids of different colors;

g. removing any residual positive photoresist; and h. laminating the array of electrophoretic cells, on a side of the array opposite the side facing the first conductor film, with a second conductor film precoated with an adhesive layer.

* * * * *